United States Patent [19]

Burhanpurkar

[11] Patent Number: 5,228,008
[45] Date of Patent: Jul. 13, 1993

[54] HOLDER FOR ROTATABLE SENSOR ARRAY

[76] Inventor: Vivek P. Burhanpurkar, Big Chief Rd. East, RR #3, Orillia, Ontario, Canada, L3V 6H3

[21] Appl. No.: 767,277

[22] Filed: Sep. 30, 1991

[51] Int. Cl.⁵ .............................................. G01S 15/00
[52] U.S. Cl. ......................................... 367/104; 367/165
[58] Field of Search ................... 367/99, 153, 165, 173, 367/188, 104

[56] References Cited

U.S. PATENT DOCUMENTS

| | | | |
|---|---|---|---|
| 4,119,900 | 10/1978 | Kremnitz | 318/587 |
| 4,203,162 | 5/1980 | Clearwaters et al. | 367/153 |
| 4,328,569 | 5/1982 | Trott et al. | 367/153 |
| 4,638,445 | 1/1987 | Mattaboni | 364/513 |
| 4,718,023 | 1/1988 | Arora | 364/513 |
| 4,893,025 | 1/1990 | Lee | 250/561 |

*Primary Examiner*—Daniel T. Pihulic
*Attorney, Agent, or Firm*—Nies, Kurz, Bergert & Tamburro

[57] ABSTRACT

A holder for holding a plurality of position sensors, such as ultrasonic position sensors, in a ganged array for pivotal movement about a vertical pivot axis passing through the holder. The holder includes a pair of housings carried on a rotatable shaft, each housing carrying six sensors in two groups of three. Each group is angularly offset from the other group. The sensors within a group are angularly offset from each other by angles that are multiples of the beam angle of the sensor beams.

21 Claims, 2 Drawing Sheets

HOLDER FOR ROTATABLE SENSOR ARRAY

BACKGROUND OF THE INVENTION

1. Field of the Invention

The present invention relates to a holder for holding a plurality of sensors in the form of combined signal transmitter-receivers. More particularly, the present invention relates to a rotatable sensor holder for holding a plurality of position sensors that are each aimed so that their respective axes are arranged at a different angle relative to each other.

2. Description of the Related Art

Rangefinding sensors generally emit a beam of light waves, sound waves, or radio waves that are reflected from a surface of an object to be sensed and are received and analyzed to determine the position of the object relative to the sensor. The effectiveness of such sensors is typically limited by beam reflection problems. Because a beam is reflected from a surface at an angle that is the same as the angle of incidence of the beam relative to the surface of the object to be sensed, if the surface of the object is so oriented that the incidence angle of the beam relative to the surface is too large, the beam can be reflected from the surface in a direction away from the sensor so that the sensor fails to receive the reflected beam, and consequently no determination of the position of the object can be made.

One way in which a single sensor has been positioned to detect objects spaced from the sensor is with the sensor supported for rotation about a vertical axis with the sensor aimed so that the beam emanates laterally, relative to the axis of rotation. However, if the surface of the object is sloped so that the tangent to the surface at the point of impact of the beam is not substantially perpendicular to the beam axis, the object will not be detected.

Another approach has been to provide a multiplicity of sensors around the outer perimeter of a cylindrical sensor holder. However, the same shortcoming exists as described above for the single sensor arrangement.

It is an object of the present invention to overcome the shortcomings of the above-described approaches to object sensing by reflected beams.

It is another object of the present invention to provide a sensor holder that orients a plurality of sensors so that beams emanating from the sensors can be received to detect objects having surfaces of varying angular orientations relative to the beam directions of the beams emanating from the sensors.

SUMMARY OF THE INVENTION

Briefly stated, in accordance with one aspect of the present invention, a holder is provided for holding a plurality of position sensors in a ganged array for pivotal movement about a pivot axis that passes through the holder and about which the holder is adapted to pivot. The holder includes a housing that carries a first set of at least two sensors, each sensor having a central axis and positioned to face outwardly of the housing. The central axes of the respective sensors of the first set of sensors each lie in and define a first plane.

A second set of at least two sensors is carried by the housing, each sensor of the second set having a central axis and positioned to face outwardly of the housing. The central axes of the respective sensors of the second set of sensors each lie in and define a second plane that defines a predetermined angle with the first plane. The sensors in each set have their axes inclined relative to other sensors of the same set.

DESCRIPTION OF THE PREFERRED EMBODIMENTS

Figure 1:
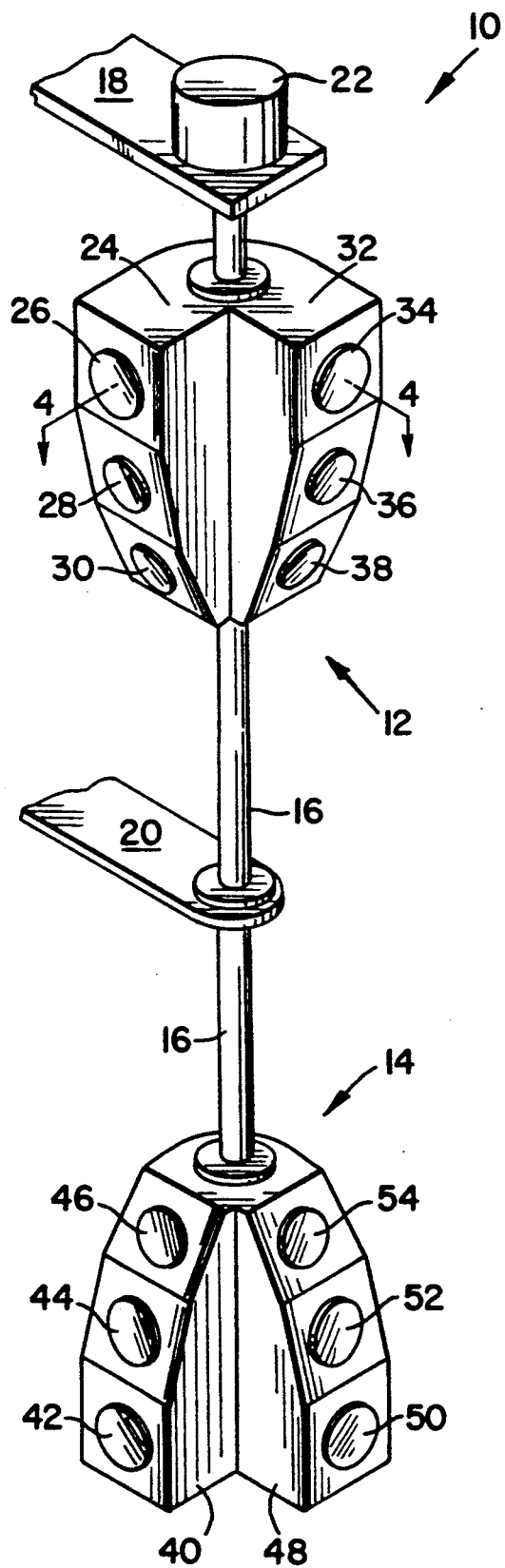
FIG. 1 is a fragmentary perspective view of a sensor holder in accordance with the present invention.

Referring now to the drawings, and particularly to FIG. 1 thereof, there is shown a sensor holder assembly 10, including a first sensor holder 12 and a second sensor holder 14. Sensor holders 12 and 14 are each carried by and are secured to a shaft 16, and are spaced from each other along the axis of shaft 16.

Support members 18 and 20 extend outwardly from a support structure (not shown) to rotatably support shaft 16 in a substantially vertical orientation for rotation about its own axis. A drive motor 22 is carried on support member 18 and directly coupled with shaft 1 to pivot shaft 16 and each of holders 12 and 14 about the shaft axis to sweep through a predetermined horizontal angle. Although shown as a direct drive arrangement, drive motor 22 can, instead, be geared to shaft 16 or, alternatively, it can be arranged to drive shaft 16 through a belt and pulley drive, as will be appreciated by those skilled in the art.

In a preferred form of the invention, drive motor 22 is a stepper motor adapted to oscillate shaft 16 through an included angle of about 95°, in order to sweep a predetermined three-dimensional space into which a sensor holder assembly having sensors that are laterally offset by about 90° is carried by a mobile carrier, such as a travelling robot (not shown). However, the angle through which shaft 16 is oscillated would be different from 95° when other sensor array arrangements are employed. For example, if the sensor array was based upon four vertical rows of sensors, instead of the two disclosed herein, the angle of oscillation could be in the vicinity of about 48°. Similarly, if only a single vertical row of sensors is provided, the angle of oscillation could be in the vicinity of about 190°.

Sensor holders 12 and 14 each carry a plurality of sensors that are directed to face outwardly relative to respective surfaces of the holders to provide a plurality of sensor beams that emanate from the respective sensors, and that are received by the sensors after the beams have been reflected from surfaces of an object to be detected by the sensors.

First sensor holder 12 includes a first sensor bank 24 that houses three individual sensors 26, 28, and 30. Each sensor in first sensor bank 24 is spaced from the other sensors in that same bank, in a direction parallel with the axis of shaft 16, and each sensor in first sensor bank 24 has its axis, which corresponds with the beam axis for the beam that emanates from that sensor, oriented to lie in a first plane that is parallel with and that passes through the axis of shaft 16.

First sensor holder 12 also includes a second sensor bank 32 that houses three individual sensors 34, 36, and 38. Each sensor in second sensor bank 24 is spaced from the other sensors in that same bank, in a direction parallel with the axis of shaft 16, and each sensor in second sensor bank 32 has its axis, which corresponds with the beam axis for the beam that emanate from that sensor, oriented to lie in a second plane that is parallel with and that passes through the axis of shaft 16.

Figure 4:
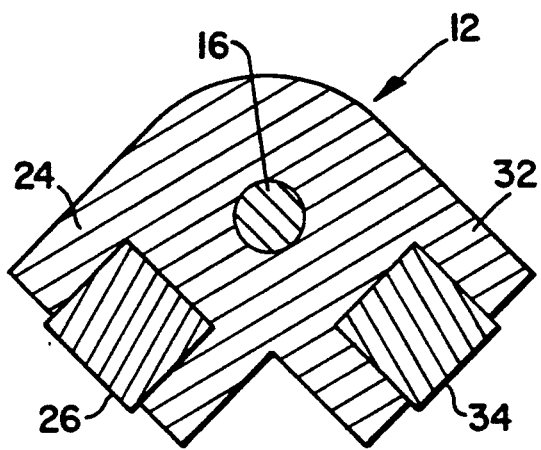
FIG. 4 is a cross-sectional view taken along the line 4—4 of FIG. 1.

As best seen in FIG. 4, sensor banks 24 and 32 are disposed to define substantially a right angle, and the first and second planes in which the axes of the respective sensors of a sensor bank lie are also so disposed as to be substantially perpendicular to each other.

Similarly, second sensor holder 14 includes a third sensor bank 40 that houses three individual sensors 42, 44, and 46. Each sensor in third sensor bank 40 is spaced from the other sensors in that same bank, in a direction parallel with the axis of shaft 16, and each sensor in third sensor bank 40 has its axis, which corresponds with the beam axis for the beam that emanates from that sensor, oriented to lie in the first plane defined by the axes of sensors 26, 28, and 30 of first sensor bank 24, and that is parallel with and that passes through the axis of shaft 16.

Second sensor holder 14 also includes a fourth sensor bank 48 that houses three individual sensors 50, 52, and 54. Each sensor in fourth sensor bank 48 is spaced from the other sensors in that same bank, in a direction parallel with the axis of shaft 16, and each sensor in fourth sensor bank 32 has its axis, which corresponds with the beam axis for the beam that emanates from that sensor, oriented to lie in the second plane defined by the axes of sensors 34, 36, and 38 of second sensor bank 32, and that is parallel with and that passes through the axis of shaft 16.

Sensor banks 40 and 48 are therefore also disposed to define substantially a right angle, and the first and second planes in which the axes of the respective sensors of a sensor bank lie are also so disposed as to be substantially perpendicular to each other.

Figures 2, 3:
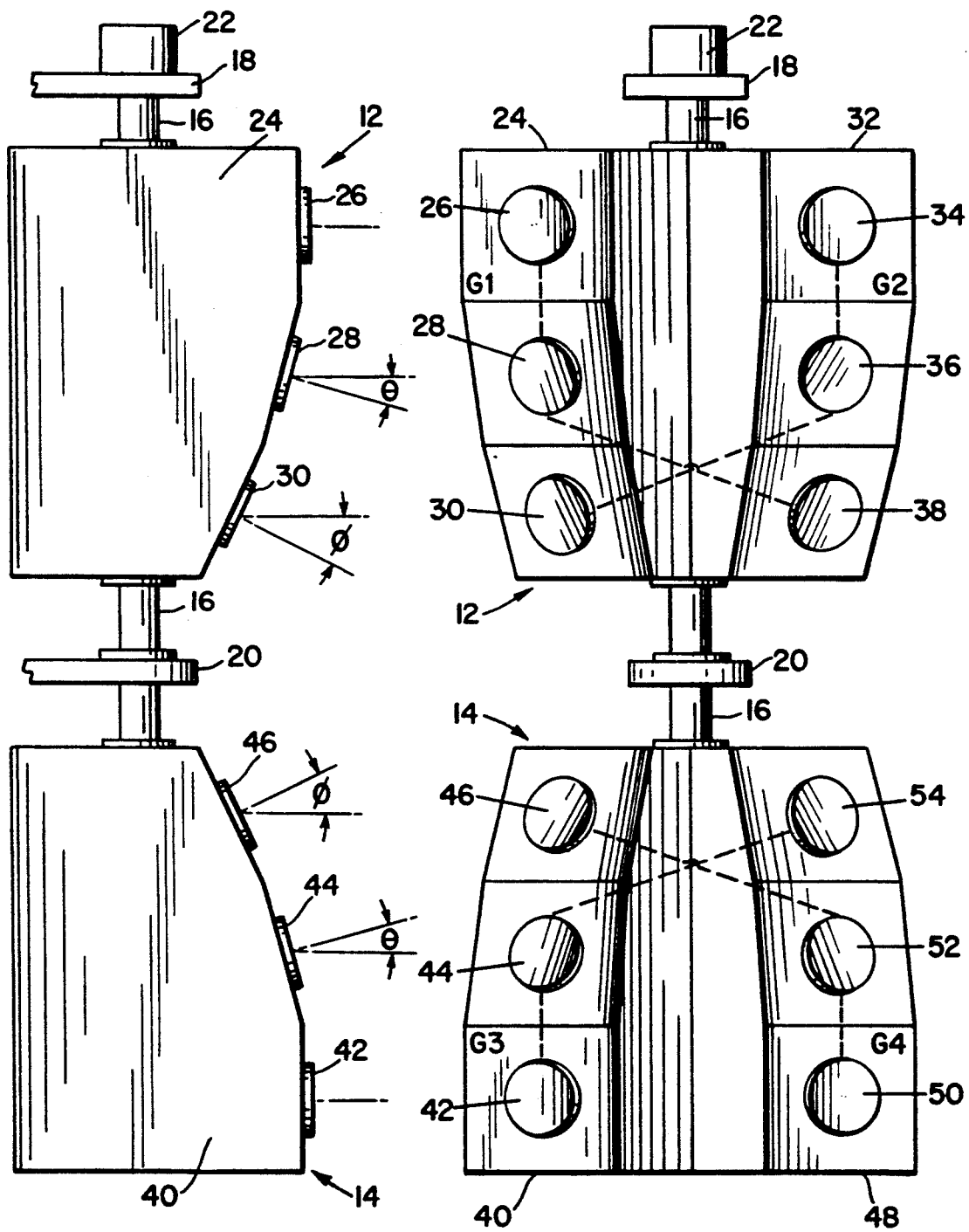
FIG. 2 is side elevational view of the sensor holder shown in FIG. 1.
FIG. 3 is a front elevational view of the sensor holder shown in FIG. 1.

As best seen in FIG. 2, although coplanar in a vertical plane, the axes of the respective sensors of a sensor bank are disposed at an angle to each other within that vertical plane. Thus, as shown in FIG. 2, the axis of sensor 26 in first sensor holder 12 extends horizontally, while the axis of next lower sensor 26 defines a downwardly inclined angle $\theta$ with the axis of sensor 26. Similarly, the axis of next lower sensor 30 defines a different downwardly inclined angle $\phi$ with the axis of sensor 26. Preferably, angle $\theta$ is substantially equal to the included angle defined by the beam that emanates from the respective sensors, and angle $\phi$ is preferably twice angle $\theta$ to provide a greater field of view for the sensor array carried by sensor holder assembly 10.

A corresponding relative angular relationship exists for the sensors in the other sensor banks. Thus it will be seen that the sensors carried by first sensor holder 12 are oriented to direct their beams horizontally or downwardly from the horizontal, while the sensors carried by second sensor holder 14 are oriented to direct their beams horizontally or upwardly from the horizontal, to thereby sweep a larger included angle than that of the individual sensor beams.

Referring now to FIG. 3, there are shown the sensors of each sensor holder 12 and 14, interconnected by dotted lines to indicate groups of sensors, as groups G1, G2, G3, and G4. As shown, each group of sensors includes two adjacent sensors in one bank and a single sensor of the other bank of the same holder. The single sensor in each instance is the innermost sensor, relative to the outer ends of the holder shaft. Thus, group G1 includes sensors 26, 28, and 38; group G2 includes sensors 34, 36, and 30; group G3 includes sensors 42, 44, and 54; and group G4 includes sensors 50, 52, and 46.

In operation, rotation of the sensor array is effected by activating motor 22, which preferably is a stepper motor, although other types of motors would also be suitable. Motor 22 is preferably so designed that it pivots shaft 16 through angular increments that correspond with the sensor beam included angle within the time interval required for a sensor to send and receive a beam to detect an object that is in the field of the sensor beams. Two perpendicularly disposed banks of sensors are provided on each sensor holder 12 and 14 in order to reduce the angular distance by which the entire sensor array must be pivoted between sensing signal transmissions and receptions.

In the course of pivotal movement of the sensor array or assembly 10, the individual groups of sensors are preferably activated in serial fashion, from G1 through G4, repetitively, in order to avoid interference between the various sensors. In that regard, it is also desirable that signals from the respective groups of sensors be readily distinguishable from each other, and therefore preferably the sensors of groups G1 and G2 operate at a first beam frequency, which can be, for example, 50 Khz., and the sensors of groups G3 and G4 operate at a second, different frequency, which can be, for example, 60 Khz.

The sensors can of any desired type, depending upon the particular application in which the sensor array is intended to be used. For example, the sensors can be combined transmitting-receiving sensors that emit infrared light waves, ultrasonic sound waves, radio frequency waves, or the like.

It will be apparent that the disclosed arrangement of position sensors provides a substantial improvement over the previously-described arrangements in that the multiple beam patterns that emanate from sensors in the disclosed arrangement sweep over a considerably larger three-dimensional space, to thereby permit the sensing of a wide variety of objects having a broad range of surface configurations and surface orientations relative to the respective beam directions.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A holder for carrying a plurality of position sensors defining an array of sensors, said holder comprising:
   a. a first housing;
   b. a first set of at least two sensors carried by the first housing, each sensor in the first set of sensors having a central axis and positioned to face outwardly of the first housing and having their respective axes lying in a first plane;
   c. a second set of at least two spaced sensors carried by the first housing, each sensor of the second set of sensors having a central axis and positioned to face outwardly of the first housing and having their respective axes lying in a second plane;
   d. wherein the sensors in each set of the first and second sets of sensors have their axes inclined relative to other sensors in the same set of sensors, and wherein the angle of inclination between a pair of adjacent sensors in a set of sensors is a selected angle and the inclination angles between non-adjacent sensors of that same set of sensors are whole number multiples of the selected angle.

2. A holder as claimed in claim 1 wherein the first plane is angularly offset from the second plane.

3. A holder as claimed in claim 2 wherein the angular offset is substantially 90°.

4. A holder as claimed in claim 1 wherein each of the sensors of a set of sensors has the same beam included angle and the selected angle is the included angle of the respective beams.

5. A holder as claimed in claim 4 wherein the whole number multiples are successive whole numbers.

6. A holder as claimed in claim 4 wherein there are three sensors in a set of sensors and the whole number multiples are successive whole numbers.

7. A holder for carrying a plurality of position sensors defining an array of sensors, said holder comprising:
  a. a first housing;
  b. a first set of at least two sensors carried by the first housing each sensor in the first set of sensors having a central axis and positioned to face outwardly of the first housing and having their respective axes lying in a first plane;
  c. a second set of at least two spaced sensors carried by the first housing, each sensor of the second set of sensors having a central axis and positioned to face outwardly of the first housing and having their respective axes lying in a second plane;
  d. wherein the sensors in each set of the first and second sets of sensors have their axes inclined relative to other sensors in the same set of sensors;
  e. a second housing connected with the first housing, a third set of at least two spaced sensors carried by the second housing, each sensor in the third set of sensors having a central axis and positioned to face outwardly of the second housing and having their respective axes lying in a third plane;
  f. a fourth set of at least two spaced sensors carried by the second housing, each sensor in the fourth set of sensors having a central axis and positioned to face outwardly of the second housing and having their respective axes lying in a fourth plane;
  g. wherein the sensors in each of the third and fourth sets of sensors have their axes inclined relative to the other sensors in the same set of sensors.

8. A holder as claimed in claim 7 wherein the third plane is angularly offset from the fourth plane.

9. A holder as claimed in claim 10 wherein the angular offset is substantially 90°.

10. A holder as claimed in claim 7 wherein each sensor in the first and second sets of sensors has its axis inclined relative to the axis of each adjacent sensor in that same set of sensors.

11. A holder as claimed in claim 10 wherein the angle of inclination between a pair of adjacent sensors in a set of sensors is a selected angle and the inclination angles between non-adjacent sensors of that same set of sensors are whole number multiples of the selected angle.

12. A holder as claimed in claim 11 wherein each of the sensors of a set of sensors has the same beam included angle and the selected angle is the included angle of the respective beams.

13. A holder as claimed in claim 12 wherein the whole number multiples are successive whole numbers.

14. A holder as claimed in claim 12 wherein there are three sensors in a set of sensors and the whole number multiples are successive whole numbers.

15. A holder as claimed in claim 7 wherein the inclination of the axes of the sensors carried by the first housing is in an opposite direction to the inclination of the axes of the sensors carried by the second housing, relative to a plane passing between the first and second housings and perpendicular to each of the first, second, third and fourth planes.

16. A holder as claimed in claim 7 wherein the first and third planes are coincident.

17. A holder as claimed in claim 7 wherein the second end fourth planes are coincident.

18. A holder as claimed in claim 7 wherein the first and third planes are coincident with each other and wherein the second and fourth planes are coincident with each other.

19. A holder as claimed in claim 7 including a connecting member extending between the first and second housings, the connecting member having a longitudinal axis, and wherein the first and second housings are each carried by the connecting member for pivotal movement about the longitudinal axis of the connecting member.

20. A holder as claimed in claim 19 wherein the first and second housings are spaced from each other along the longitudinal axis of the connecting member.

21. A holder as claimed in claim 19 including a drive motor drivingly connected with the connecting member for pivoting the connecting member and the first and second housings about the connecting member longitudinal axis.

* * * * *